United States Patent
Nykanen

(10) Patent No.: US 6,728,774 B1
(45) Date of Patent: Apr. 27, 2004

(54) TRANSACTION SUPPORT FOR IRDA-COMPATIBLE SYSTEMS

(75) Inventor: Petri Nykanen, Tampere (FI)

(73) Assignee: Nokia Mobile Phones Limited, Salo (FI)

( * ) Notice: Subject to any disclaimer, the term of this patent is extended or adjusted under 35 U.S.C. 154(b) by 1048 days.

(21) Appl. No.: 08/784,087

(22) Filed: Jan. 15, 1997

(51) Int. Cl.[7] .............................................. G06F 15/16
(52) U.S. Cl. ...................... 709/230; 398/127; 398/135; 370/467; 370/469
(58) Field of Search .................. 359/172, 152, 359/118; 709/230; 370/467, 469; 398/127, 135

(56) References Cited

U.S. PATENT DOCUMENTS 6,519,644 B1 * 2/2003 Lindquist et al. ........... 709/227

* cited by examiner

*Primary Examiner*—Kinfe-Michael Negash
(74) *Attorney, Agent, or Firm*—Perman & Green, LLP

(57) ABSTRACT

A system to adapt the MAC rules of the IrLAP specification to accomodate various IR transceiver devices with media sense utilizes an IrDA protocol stack having a series of layers including:

Figure 1:
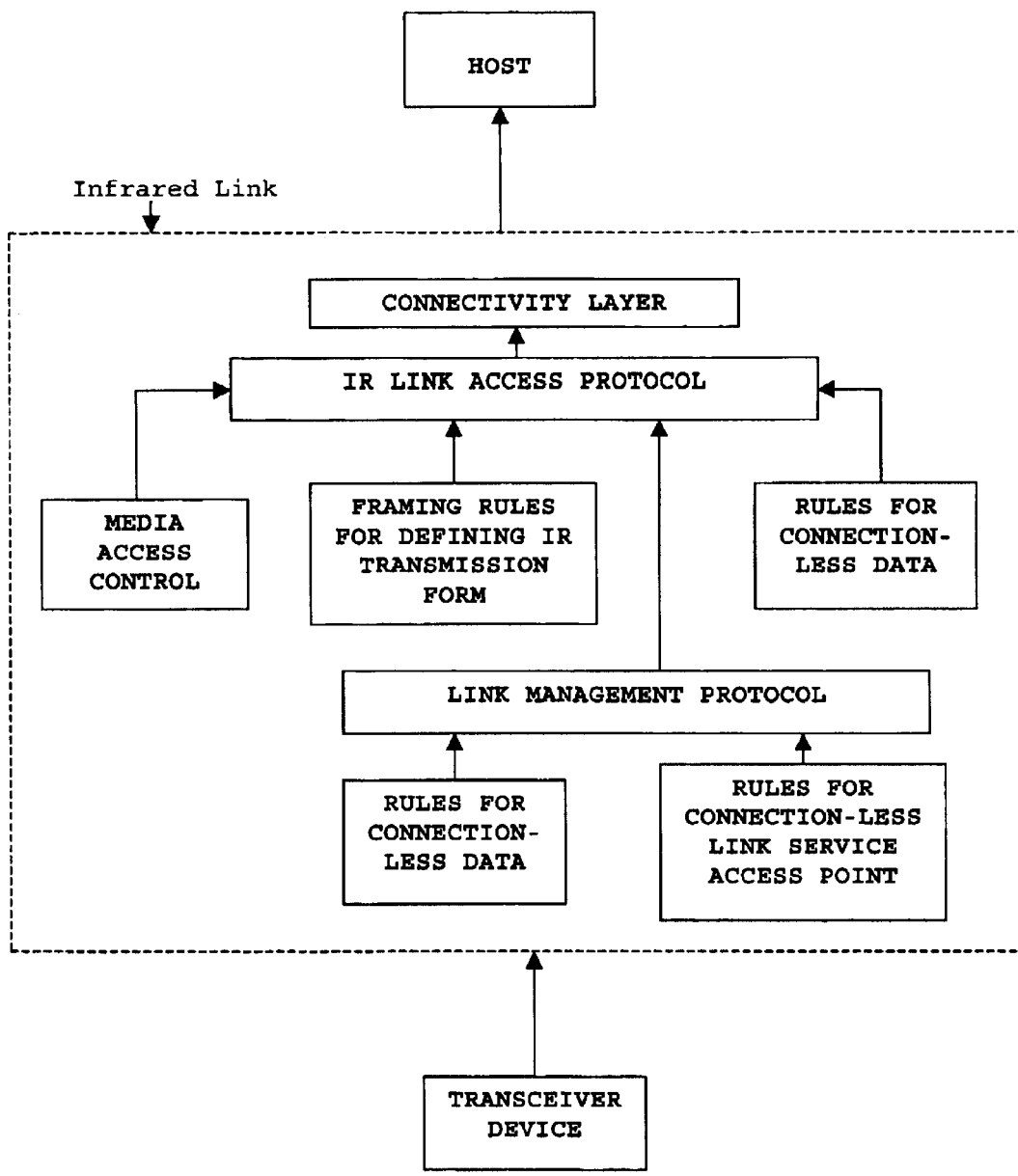

| IR Protocol Layers | OSI Model |
|---|---|
| | Transaction Service |
| 3. Link Management Protocol | Network |
| | Connection-less LSAP; |
| LMP | Connection-less data. |
| 2. Link Access Protocol | Data Link |
| | Connection-less data; |
| LAP | Framing: Rx & Tx; |
| | MAC. |
| 1. Connectivity | Physical |
| | IrDA-SIR, | where LSAP is the Link Service Access Point. This kind of protocol stack can be applied to a very large variety of devices, such as, remote controllers with feedback for tuners; can be used for data transactions by request, e.g., pager reporting of received numbers; and is applicable to data acquisition systems, such as, portable GPS reporting of changes of location and medical systems. Various ways for implementing the invention comprise: using the connection-less data service; using XID frames; or using proprietary or open object definitions; with the use of the connection-less data service that is already present in the IrDA specification along with the emerging OBEX object definitions being preferred. Implementation requires no changes in existing systems, and the open service specification ensures connectivity between systems from different vendors.

38 Claims, 1 Drawing Sheet

TRANSACTION SUPPORT FOR IRDA-COMPATIBLE SYSTEMS

The present application is related to co-pending Provisional patent application Ser. No. 60/009,954 of Petre Nykanen, filed Jan. 16, 1996, entitled "TRANSACTION SUPPORT FOR IrDA-COMPATIBLE SYSTEMS", and based on which priority is herewith claimed under 35 U.S.C. 119(e) and the disclosure of which is incorporated herein by reference in its entirety.

BACKGROUND OF THE INVENTION

1. Field of the Invention

The present invention relates to protocols for use with infra-red (IR) transmitting devices, e.g., the IrDA (Infra-red Data Association) transmission protocols, and, more particularly, to a method and means for providing transition support for IrDA-compatible systems including transceivers with media sense.

2. Prior Art

The Media Access Control (MAC) rules of the IrLAP (Link Access Protocol) specification presently being discussed by the IrDA for standardizing infra-red (IR) communications (this and related standards information are available electronically on the IrDA web site located at "irda.org") require that before initiating an IR transmission a transceiver device must be set to listen for at least 500 ms and detect no IR data link connection during that time. This 500 ms delay may cause problems with certain systems in which the IrLAP specification might be applied, such as remote controllers. These delay problems can be avoided to some extent if the transmitter device is set to continuously listen in the IR domain. In such case, if no IR traffic is detected when transmission is requested, a connection-less data transmit request can be fulfilled instantaneously, whereas in the usual case connection-less services are slowed down. However, such continuously listening devices have a major drawback when traffic is detected in the IR domain as the device is rendered useless until the IR domain is free and available to transmit.

Alternative approaches that could be used to make the IrDA protocols more attractive for use with remote controllers, include:

- the MAC rules could be relaxed in the IrLAP specifications in such a way that the connection-less data service would have relaxed MAC, since connection-oriented data transmission is able to recover from occasional lost frames when prevented from being sent by a connection-less data frame; or
- low-end devices could be authorized to emit a connection-less data frame even if they detect other traffic, but some rules concerning timing limits would have to be generated so that the connection-less data would not destroy a link connection; or
- the user data for higher layers, i.e., objects, could be placed in the XID frames used for sniffing, which would give access to the relaxed MAC of the sniffing frames.

From a hardware standpoint, systems in the consumer electronics field require longer transmission distances than those supported by most IrDA-SIR (the official IrDA specification) implementations. Thus, consumer electronics applications may require changes in the IrDA-SIR definition for the minimum distance required from transceiver devices and for the maximum output power that may be used.

The IrDA connection-oriented data service specifications do not fit inside the limitations of consumer electronics devices. The size of the implementation and the processing power required rule out the use of the connection-oriented data service as a viable option in this regard. To achieve connectivity between IrDA devices supporting IrDA specifications and devices in the consumer electronics field, a common minimum functionality must be selected in such a way that both high-end desk top systems and low-end systems, such as remote controllers, can rely on this functionality.

Problem to be Solved:

It is therefore a problem in the art to combine the functionality of the connection-less data service of the IrLAP and IrLMP (Link Management Protocol) with object encapsulation rules, as defined in IrDA object exchange (OBEX) specifications, to accomodate various IR transceiver devices particularly those used in consumer electronics.

Object:

It is accordingly an object of the present invention to provide a method and means for providing transaction support for IrDA-compatible systems including transceivers with media sense.

It is another object of the present invention to provide such support by placing the object exchange rules of the IrDA OBEX specifications in the data of the connection-less service of the IrLAP and IrLMP protocols.

SUMMARY OF THE INVENTION

The present invention involves a method and means to adapt the MAC rules of the IrLAP specification to accomodate various IR transceiver devices with or without media sense. The invention utilizes an IrDA protocol stack having a series of layers including:

| IR Protocol Layers | OSI Model Transaction Service |
|---|---|
| 3. Link Management Protocol LMP | Network Connection-less LSAP; Connection-less data. |
| 2. Link Access Protocol LAP | Data Link Connection-less data; Framing: Rx & Tx; MAC. |
| 1. Connectivity | Physical IrDA-SIR. | where OSI is Open Systems Interconnection and LSAP is the Link Service Access Point.

This kind of protocol stack can be applied to a very large variety of devices, such as, remote controllers with feedback for tuners, televisions, videos, audio equipment, and PCs. Also, it can be used for data transactions by request, e.g., pager reporting of received numbers, phone reporting of caller ID, or cellular telephone sending of a phone book entry. Further, it is applicable to data acquisition systems, such as, portable GPS reporting of changes of location and medical systems.

Various ways for implementing the invention comprise:

Using the connection-less data service;

Using XID frames; or

Using proprietary or open object definitions.

The preferred approach is to use the connection-less data service that is already present in the IrDA specification along with the emerging OBEX object definitions. This approach requires no changes in existing systems and the open service specification ensures connectivity between systems from different vendors.

DETAILED DESCRIPTION OF THE PREFERRED EMBODIMENT

The present invention is directed to a method and means for adapting the Media Access Control rules of the IrLAP specification to accomodate various IR transceiver devices with or without media sense, particularly those used in consumer electronics. As seen in the following diagram, the invention preferably comprises an IrDA protocol stack having a series of functional layers, along the lines of the Open Systems Interconnection (OSI) Model, including:

| IR Protocol Layers | OSI Model Transaction Service |
|---|---|
| 3. Link Management Protocol LMP | Network Connection-less LSAP; Connection-less data. |
| 2. Link Access Protocol LAP | Data Link Connection-less data; Framing: Rx & Tx; MAC. |
| 1. Connectivity | Physical IrDA-SIR. | where OSI is Open Systems Interconnection and LSAP is the Link Service Access Point.

The Physical layer, Layer 1., may be different from device to device. The IrDA-SIR, the official IrDA specification, i.e., involving speeds up to 115.2 kbit/sec, is shown in the diagram. However, other such specifications might be used, such as the IrDA-FIR, which is a proposed Fast IR with speeds up to 1.152 Mbit/sec and 4 Mbit/sec, and the Sharp DASK, which is a Sharp specific system with speeds up to 57.6 kbit/sec.

The Data Link layer protocol is the IrLAP protocol layer, Layer 2. This protocol supports discovery of other devices and reliable data transmission service. This layer must follow MAC rules as well as indicating correctly to other devices that the IR medium is in use.

The Network layer protocol is the IrLMP protocol layer, Layer 3. This protocol supports service-to-service connection binding, and division of the reliable IrLAP connection to multiple channels. This frame-by-frame multiplexing enables multiple concurrent services.

On top of the IrLMP layer there may be multiple protocols implementing various functions, such as those of a transport layer, i.e., segmentation and reassembly, flow control, and so on. The layer on top of the others is the application layer which contains the services that support functions needed by applications, such as the IrDA specified Information Access Service (IAS). The IAS consists of a client and server, with the client being able to make inquiries to the server concerning services that the host system supports. The server fetches information from a local database consisting of service instance specific information, the most important piece of which information is the LSAP ID (Link Service Access Point) at which the service instance is located in the host system. This information is used when service-to-service connection is made.

By way of the functions of the layers, the following description illustrates some of the more important features in this regard.

Discovery:

The discovery process, supported by the Data Link layer protocol, i.e., the IrLAP protocol layer, Layer 2, is used to enable a station to find out what other devices can be seen in the IR medium. This process is implemented by the IrLAP layer, though it is channeled through the IrLMP layer to the users of that layer. The discovery process is dynamic, and so allows multiple devices to be identified by one query. Every responding device may return to the initiator:

1) a 32 bit device address (variable by specification);
2) service hints by means of a bitfield indicating the service categories supported, for example, fax, modem, telephony, PDA and printer; and
3) a name of the device, e.g., a user definable string such as "Bob's PDA".

After discovery, the user may make a selection of the host device to be connected to, or the connection establishment may be made automatically. To find out if the specific service is supported by the host system, the IAS service connection may be established.

IAS access:

The IAS service access is used to find out if the host system supports the service that is required. If there are multiple host systems, an IrLAP connection is made with all of them, one by one, to find out which system supports the required service. This IAS access may be done through binding the local LSAP X with the host LSAP 0, with the IAS server always being resident at LSAP 0. The information that is fetched by the local IAS client from the host IAS database is defined in the service specification. The information may vary depending on the service, but one or two things that will always be present are the instance name of the service and the LSAP at which it can be accessed on the host system.

Service Connection Establishment:

When the desired host with the required service is located, a service-to-service connection is established. This service connection is not active until the local LSAP is bound with the host LSAP by the IrLMP layer. In this binding the LSAPs are interconnected so that data coming to the local LSAP from the bound host LSAP is accepted, and vise versa. After this point the service specific protocol may be activated.

The IrLMP LSAP binding primitives may contain a field of user date (up to 60 octets). This data can be used in the connection establishment for such purposes as exchanging encryption keys. The encryption method, if any, is such that the service implementation may use any available encryption method. Common to all these methods is, that their area of influence is limited to the data transmitted between the two given LSAPs. IrLAP or IrLMP protocol specific fields in the frames are not affected by the encryption. A third party may be able to see that transactions are taking place between the two service instances, but is unable to decipher the actual data content.

Implementation:

The implementation of the protocol stack should be such that the end user is given an indication when the IrLAP layer connection is lost. The IrDA specification dictates that a "No Activity" indication be given to the end user when the link has been lost for 3 seconds. The actual service connection will be lost when a disconnect indication is received. This may happen when the link has been lost from 8 to 40 seconds (a negotiated value).

Intermediate Node:

The IrDA protocol stack of the invention may act as an intermediate node between two devices supporting known services. In such an implementation, there are five important factors to be taken into consideration:

the service specification and the IAS information
implementation of the connection establishment
use of encryption
user interaction and indications
interfacing to the existing service protocol stack.

In general, it is important to understand the extent of the IrDA specifications in this regard in that some things are left out on purpose, to give the designer the freedom of different implementation choices. It will be within the purview of those of skill in the art to implement the invention in the context of the IrDA specifications.

This kind of protocol stack can be used in a very large variety of devices, such as, remote controllers with feedback for tuners, as well as televisions, videos, audio equipment, and PCs. Also, it can be used for data transactions by request, e.g., pager reporting of received numbers, phone reporting of caller ID, or cellular telephone sending of a phone book entry. Further, it is applicable to data acquisition systems, such as, for portable GPS reporting of changes of location and medical systems.

Various ways for implementing the invention comprise:
Using the connection-less data service;
Using XID frames; or
Using proprietary or open object definitions.

The preferred approach is to use the connection-less data service that is already present in the IrDA specification along with the emerging OBEX object definitions. This method requires no changes in existing systems. The open service specification ensures connectivity between systems from different vendors. Connection-oriented data may also be used but not in all situations because the MAC rules, or the size of the implementation, or the performance of the microprocessor.

The invention makes it possible for the consumer electronics industry to implement the IrDA protocols in their systems so that the manufacturers of these systems will be inclined to adopt the IrDA hardware specifications. This will promote standardization of the IR protocols. The hardware specifications may require some changes concerning the distance and the output power of the IR systems, but support of the common hardware is the basic requirement for connectivity.

Supporting the same hardware platform and the same IrDA protocols in both the communications and consumer electronics industries should attract more and more companies to consider the connectivity as a value in the market. This support also means that many interference issues would be avoided, because the IrDA protocols do support Media Access Control to minimize interference.

The invention can be applied to a very large variety of devices such as the aforementioned remote controllers for tuners, televisions, videos, audio equiptment, and PCs, as well as phones, cellular phones, pagers, toys, data generating systems such as portable GPS receivers, watches or PIMs with alarms or time functions or for the entering of appointments.

Even though the IrDA protocols can be used for the systems in the consumer electronics field without modifications, there may be some changes required in the IrDA IrLAP media access rules and in the hardware layer specifications, which changes will be within the skill of the art in the light of the foregoing descriptions.

What is claimed is:

1. A method of defining an IrDA protocol stack having a series of layers, for providing transaction support for IrDA-compatible systems including at least a transceiver device and a host adapted for IR transmissions therebetween, comprising the steps of:
   providing a Connectivity layer defining the operating conditions for a physical IR link between said transceiver device and said host;
   providing an Ir Link Access Protocol (IrLAP) layer, cooperating with said Connectivity layer, defining the specification for establishing a physical IR link between said transceiver device and said host, and comprising:
      Media Access Control (MAC) rules for the IrLAP specification defining the requirements before the initiation of an IR transmission between said transceiver device and said host;
      Framing rules for defining the form of transmitted (Tx) and received (Rx) IR transmissions between said transceiver device and said host; and
      connection-less data defining rules for the IrLAP layer; and
   providing a Link Management Protocol (LMP) layer, cooperating with said IrLAP layer, defining the specification for establishing service-to-service connection binding, and division of a reliable IrLAP connection to multiple channels, using frame-by-frame multiplexing, and comprising:
      connection-less data defining rules for the LMP layer; and
      connection-less Link Service Access Point (LSAP) defining rules for establishing a service-to-service connection by binding an LSAP of said transceiver device with an LSAP of said host for transmitting and accepting data in IR transmissions exchanged therebetween.

2. The method of claim 1 wherein said stack is implemented using XID frames.

3. The method of claim 1 wherein said stack is implemented using one of proprietary object definitions and open object definitions.

4. The method of claim 1 further comprising the step of providing a Transaction Service layer, cooperating with said Link Management Protocol (LMP) layer.

5. The method of claim 1 further comprising the step of providing an application Layer, cooperating with said Link Management Protocol (LMP) layer, containing the services that support functions needed by applications.

6. The method of claim 5 wherein said services comprise the IrDA specified Information Access Service (IAS).

7. The method of claim 1 wherein said stack is implemented using an Open Systems Interconnection (OSI) Model.

8. The method of claim 1 wherein said Link Access Protocol (IrLAP) layer supports discovery of other devices and reliable data transmission service.

9. The method of claim 1 wherein said Link Management Protocol (LMP) layer supports service-to-service connection binding, and division of the reliable IrLAP connection to multiple channels whereby the frame-by-frame multiplexing enables multiple concurrent services.

10. In an IrDA-compatible system including a transceiver device and a host, means for providing transaction support for IR transmissions between said transceiver device and host by producing an IrDA protocol stack having a series of layers, said means comprising:
   means for producing a Connectivity layer for defining the operating conditions for a physical IR link between a transceiver device and a host;
   means for producing an Ir Link Access Protocol (IrLAP) layer, cooperating with said Connectivity layer, for defining the specification for establishing a physical IR link between a transceiver device and a host, and comprising:
Media Access Control (MAC) rules for the IrLAP specification defining the requirements before the initiation of an IR transmission between a transceiver device and a host;
Framing rules for defining the form of transmitted (Tx) and received (Rx) IR transmissions between a transceiver device and a host; and
connection-less data defining rules for the IrLAP layer; and
means for producing a Link Management Protocol (LMP) layer, cooperating with said IrLAP layer, for defining the specification for establishing service-to-service connection binding, and division of a reliable IrLAP connection to multiple channels, using frame-by-frame multiplexing, and comprising:
connection-less data defining rules for the LMP layer; and
connection-less Link Service Access Point (LSAP) defining rules for establishing a service-to-service connection by binding a transceiver device LSAP with a host LSAP for transmitting and accepting data in IR transmissions exchanged therebetween.

11. An IrDA-compatible system as in claim 10 further comprising means for implementing said stack using XID frames.

12. An IrDA-compatible system as in claim 10 further comprising means for implementing said stack using one of proprietary object definitions and open object definitions.

13. An IrDA-compatible system as in claim 10 further comprising means for providing a Transaction Service layer, cooperating with said Link Management Protocol (LMP) layer.

14. An IrDA-compatible system as in claim 10 further comprising means for providing an application Layer, cooperating with said Link Management Protocol (LMP) layer, containing the services that support functions needed by applications.

15. An IrDA-compatible system as in claim 14 wherein said services comprise the IrDA specified Information Access Service (IAS).

16. An IrDA-compatible system as in claim 10 further comprising means for implementing said stack using an Open Systems Interconnection (OSI) Model.

17. An IrDA-compatible system as in claim 10 wherein said Link Access Protocol (IrLAP) layer further comprises means for supporting discovery of other devices and reliable data transmission service.

18. An IrDA-compatible system as in claim 10 wherein said Link Management Protocol (LMP) layer further comprises means for supporting service-to-service connection binding, and division of the reliable IrLAP connection to multiple channels whereby the frame-by-frame multiplexing enables multiple concurrent services.

19. An IrDA protocol stack, for providing transaction support for IrDA-compatible systems including a transceiver device and a host adapted for IR transmissions therebetween, said protocol stack being incorporated in at least one of said transceiver and host and defining a series of layers comprising:
a Connectivity layer for defining the operating conditions for a physical IR link between a transceiver device and a host;
an Ir Link Access Protocol (IrLAP) layer, cooperating with said Connectivity layer, for defining the specification for establishing a physical IR link between a transceiver device and a host, and comprising:
Media Access Control (MAC) rules for the IrLAP specification defining the requirements before the initiation of an IR transmission between a transceiver device and a host;
Framing rules for defining the form of transmitted (Tx) and received (Rx) IR transmissions between a transceiver device and a host; and
connection-less data defining rules for the IrLAP layer; and
a Link Management Protocol (LMP) layer, cooperating with said IrLAP layer, for defining the specification for establishing service-to-service connection binding, and division of a reliable IrLAP connection to multiple channels, using frame-by-frame multiplexing, and comprising:
connection-less data defining rules for the LMP layer; and
connection-less Link Service Access Point (LSAP) defining rules for establishing a service-to-service connection by binding a transceiver device LSAP with a host LSAP for transmitting and accepting data in IR transmissions exchanged therebetween;
and wherein said stack is implemented using the connection-less data service that is already present in the IrDA specification along with the emerging OBEX object definitions.

20. An IrDA protocol stack as in claim 19 further comprising a Transaction Service layer, cooperating with said Link Management Protocol (LMP) layer.

21. An IrDA protocol stack as in claim 19 further comprising an application Layer, cooperating with said Link Management Protocol (LMP) layer, containing the services that support functions needed by applications.

22. An IrDA protocol stack as in claim 21 wherein said services comprise the IrDA specified Information Access Service (IAS).

23. An IrDA protocol stack as in claim 19 wherein said Link Access Protocol (IrLAP) layer supports discovery of other devices and reliable data transmission service.

24. An IrDA protocol stack as in claim 19 wherein said Link Management Protocol (LMP) layer supports service-to-service connection binding, and division of the reliable IrLAP connection to multiple channels whereby the frame-by-frame multiplexing enables multiple concurrent services.

25. A method of defining an IrDA protocol stack having a series of layers, for providing transaction support for IrDA-compatible systems including at least a transceiver device and a host adapted for IR transmissions therebetween, comprising the steps of:
providing a Connectivity layer defining the operating conditions for a physical IR link between said transceiver device and said host;
providing an Ir Link Access Protocol (IrLAP) layer, cooperating with said Connectivity layer, defining the specification for establishing a physical IR link between said transceiver device and said host, and comprising:
Media Access Control (MAC) rules for the IrLAP specification defining the requirements before the initiation of an IR transmission between said transceiver device and said host;
Framing rules for defining the form of transmitted (Tx) and received (Rx) IR transmissions between said transceiver device and said host; and
connection-less data defining rules for the IrLAP layer; and providing a Link Management Protocol (LMP) layer, cooperating with said IrLAP layer, defining the specification for establishing service-to-service connection binding, and division of a reliable IrLAP connection to multiple channels, using frame-by-frame multiplexing, and comprising:

connection-less data defining rules for the LMP layer; and connection-less Link Service Access Point (LSAP) defining rules for establishing a service-to-service connection by binding an LSAP of said transceiver device with an LSAP of said host for transmitting and accepting data in IR transmissions exchanged therebetween;

and wherein said stack is implemented using the connection-less data service that is already present in the IrDA specification along with the emerging OBEX object definitions.

26. The method of claim 25 further comprising the step of providing a Transaction Service layer, cooperating with said Link Management Protocol (LMP) layer.

27. The method of claim 25 further comprising the step of providing an application Layer, cooperating with said Link Management Protocol (LMP) layer, containing the services that support functions needed by applications.

28. The method of claim 27 wherein said services comprise the IrDA specified Information Access Service (IAS).

29. The method of claim 25 wherein said stack is implemented using an Open Systems Interconnection (OSI) Model.

30. The method of claim 25 wherein said Link Access Protocol (IrLAP) layer supports discovery of other devices and reliable data transmission service.

31. The method of claim 25 wherein said Link Management Protocol (LMP) layer supports service-to-service connection binding, and division of the reliable IrLAP connection to multiple channels whereby the frame-by-frame multiplexing enables multiple concurrent services.

32. An IrDA-compatible system including a transceiver device, a host, and means for providing transaction support for IR transmissions between said transceiver device and host by producing an IrDA protocol stack having a series of layers, comprising:

means for producing a Connectivity layer for defining the operating conditions for a physical IR link between a transceiver device and a host;

means for producing an Ir Link Access Protocol (IrLAP) layer, cooperating with said Connectivity layer, for defining the specification for establishing a physical IR link between a transceiver device and a host, and comprising:

Media Access Control (MAC) rules for the IrLAP specification defining the requirements before the initiation of an IR transmission between a transceiver device and a host;

Framing rules for defining the form of transmitted (Tx) and received (Rx) IR transmissions between a transceiver device and a host; and connection-less data defining rules for the IrLAP layer;

means for producing a Link Management Protocol (LMP) layer, cooperating with said IrLAP layer, for defining the specification for establishing service-to-service connection binding, and division of a reliable IrLAP connection to multiple channels, using frame-by-frame multiplexing, and comprising:

connection-less data defining rules for the LMP layer; and connection-less Link Service Access Point (LSAP) defining rules for establishing a service-to-service connection by binding a transceiver device LSAP with a host LSAP for transmitting and accepting data in IR transmissions exchanged therebetween; and means for implementing said stack using the connection-less data service that is already present in the IrDA specification along with the emerging OBEX object definitions.

33. An IrDA-compatible system as in claim 32 further comprising means for providing a Transaction Service layer, cooperating with said Link Management Protocol (LMP) layer.

34. An IrDA-compatible system as in claim 32 further comprising means for providing an application Layer, cooperating with said Link Management Protocol (LMP) layer, containing the services that support functions needed by applications.

35. An IrDA-compatible system as in claim 34 wherein said services comprise the IrDA specified Information Access Service (IAS).

36. An IrDA-compatible system as in claim 32 further comprising means for implementing said stack using an Open Systems Interconnection (OSI) Model.

37. An IrDA-compatible system as in claim 32 wherein said Link Access Protocol (IrLAP) layer further comprises means for supporting discovery of other devices and reliable data transmission service.

38. An IrDA-compatible system as in claim 32 wherein said Link Management Protocol (LMP) layer further comprises means for supporting service-to-service connection binding, and division of the reliable IrLAP connection to multiple channels whereby the frame-by-frame multiplexing enables multiple concurrent services.

* * * * *